June 21, 1960  K. LEHOVEC  2,942,110
BATTERYLESS RADIATION INDICATOR
Filed March 9, 1955

SUBSTITUTE FOR MISSING XR

INVENTOR
KURT LEHOVEC
BY
Connolly and Hutz
HIS ATTORNEYS

United States Patent Office 2,942,110
Patented June 21, 1960

2,942,110

BATTERYLESS RADIATION INDICATOR

Kurt Lehovec, South Williamstown, Mass., assignor to Sprague Electric Company, North Adams, Mass., a corporation of Massachusetts Filed Mar. 9, 1955, Ser. No. 493,095

5 Claims. (Cl. 250—83.3)

This invention relates to subatomic radiation indicators such as those that can be used to indicate the presence of radioactive material.

Among the objects of the present invention is the provision of a batteryless indicator of the above type which is efficient and at the same time small, easy to manage, and does not call for maintenance.

Figure 1:
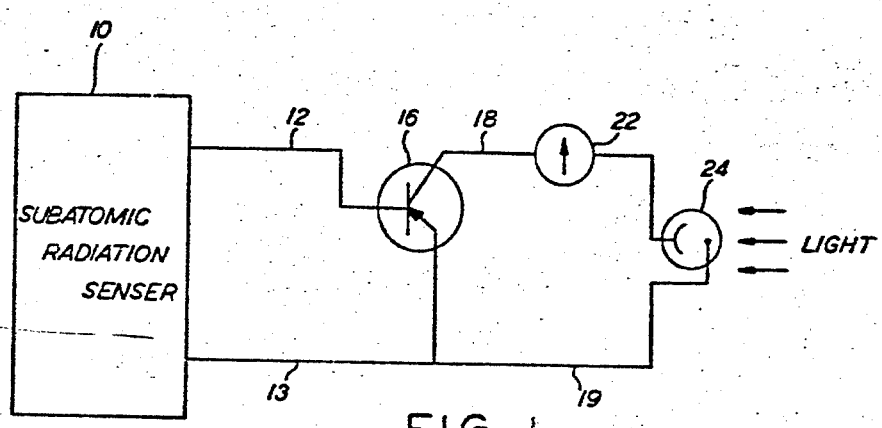
Figure 2:
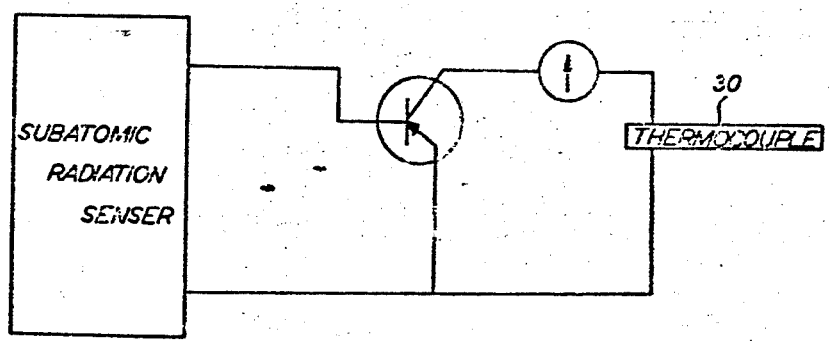

The above as well as additional objects of the present invention will be more clearly understood from the following description of several of its exemplifications, reference being made to the accompanying drawings wherein:

Fig. 1 is a schematic diagram showing one form of a subatomic radiation indicator according to the present invention; and Fig. 2 is a similar showing of a modified form of subatomic radiation indicator embodying the present invention.

Semiconductor barrier layer cells such as those discussed in an article by P. Rappaport, Phys. Rev. 93, 246 (1954), entitled The Electron-Voltaic Effect in p-n junctions Induced by Beta-Particle Bombardment," will respond to subatomic radiation, such as beta rays, by the generation of a minute electric current. This generation takes place in the absence of external power supplies. Unfortunately the amount of current generated in this way is usually of the order of one microampere. Although it is possible to measure such minute currents, simple meters of the kind that are portable, light, compact and fairly rugged, are not available for this purpose. On the other hand, prior art amplification of the current to bring it to the magnitude that can be reliably measured by simple meters introduces further difficulties.

According to the present invention, a very convenient form of indicator of the above type is provided by a semiconductor barrier layer cell having a transistor connected to amplify its current, the transistor in turn being powered by a power-supplying transducer that is energized by low frequency radiation such as ordinary illumination or body heat.

Referring to Fig. 1, a subatomic radiation sensor 10, which can be a conventional semiconductor barrier layer cell, has output leads 12, 13 connected to the input terminals of a transistor 16. The transistor's output leads 18, 19 are in turn connected through a current measuring meter 22 to a photovoltaic cell 24. The cell is exposed to ambient light such as ordinary daylight and can supply as little as one milliampere at a potential of about one volt or even less. An ordinary silicon type cell such as that described in the letter by Cummerow, Phys. Rev. 95, 561 (1954), and the D. Chapin et al. letter of the J. Appl. Phys. 25, 676 (1954), will be suitable.

The transistor 16 is shown as connected in a so-called grounded emitter amplifying circuit, that is, its emitter lead is common to its input and output. With this arrangement, a potential as low as one volt will actuate the transistor to amplify a one microampere current by as much as 30 to 50 times or more. Inasmuch as standard meters 22 are available in relatively small, rugged sizes to measure as little as 25 microamperes, Fig. 1 represents a very practical combination. By merely arranging the components in a suitable container so that the sensor 10 is exposed to subatomic radiation while cell 24 is exposed to daylight, the meter 22 will conveniently indicate subatomic radiation and the entire apparatus will be relatively small and light in weight. The transistor and photovoltaic cell themselves will take up only about one cubic inch of space, and their combined weight will only be a few grams. The meters 22 can weigh as little as ¼ pound and can be fitted into a space of less than 10 cubic inches.

In accordance with the standard practice, it is sometimes helpful to insert a biasing resistor in the emitter return connection to stabilize the amplification. This resistor need be only about 400 ohms, and is desirably bypassed by a capacitance of up to several microfarads in order to minimize the degenerative effects of the resistor on the amplification.

If desired, the combination can be arranged to provide an aural indication of subatomic radiation as by having the meter of the standard D'Arsonval type with a pointer that is actuated by the amplified current, and a stop which the pointer will strike when it is actuated through a sufficient amplitude. In striking this stop, the pointer will generate a distinct tick-like sound which is easily heard. Where the amplification is arranged to provide currents larger than the measuring range of the meter, the standard upper limit stop for the pointer will provide the sound without requiring a modification of the meter. To increase the intensity of the sound, the stop can be arranged to provide a metal-to-metal engagement when hit by the moving pointer. Furthermore, the meter can be carried on the head or around the neck so that the sound would be generated close to the ear while the remainder of the apparatus can be connected at the end of a cable so that it can be conveniently held close to the ground or some object to be particularly tested.

Although a point-contact transistor can be used, for best results a junction transistor is desirable inasmuch as the current amplification of junction transistors, either of the N-p-N or p-N-p type is much larger than that of point-contact transistors. The amplified current output is relatively insensitive to changes of actuating potential as long as this potential is above a minimum of about ½ volt. The combination will accordingly be able to provide a fairly closely reproducible meter operation even though the light intensity is subject to wide variation. The grounded or common emitter type of connection is preferred since it generally provides the maximum degree of amplification with either point-contact or junction transistors. p-N-p-N junction transistors are also suitable for use in the combination of Fig. 1.

Fig. 2 shows a combination similar to Fig. 1 except that a thermocouple 30 is used instead of a photovoltaic cell, to provide the transistor operating power. By using a thermocouple having a plurality of series-connected cold and hot junctions, particularly with thermocouple pairs, such as germanium and lead or silicon and lead, that provide a relatively high voltage output per junction, an output power of several volts sufficient to deliver a few milliamperes of current is readily obtained. The cold and hot junctions should be separated from each other and all the hot junctions collected in one place so that the collection can be conveniently held against a person's body while the cold junctions are exposed to the outside temperature. The hot junctions can, for example, be arranged to be inserted under an armpit while the cold junctions are carried with the meter around the neck or on the head. The hot junctions can in this way be kept very close to the 37° C. normal body temperature while the cold junctions will, if not directly exposed to sunshine or hot summer daytime temperatures, usually be maintained at least about 10 to 20 degrees colder.

An advantage of the thermocouple power system of Fig. 2 is that it does not need any appreciable amount of daylight for its operation, particularly where aural signals are to be used rather than the visual reading of the meter. A very desirable form of the invention can, for example, have a plug-in connection into which either the photovoltaic cell or the thermocouple can be plugged. Alternatively, both can be permanently wired in place with a switch that selectably connects one at a time. In this way, during daylight hours the photovoltaic cell can be used, particularly in the summertime, while it can be replaced by the thermocouple in the evening or during the night. Even in summertime in most places in the temperate zones, or even in the torrid zone at reasonable altitudes, the night temperatures will be sufficiently low to enable the thermocouple to provide good power.

The subatomic radiation sensor 10 is not restricted to being a semi-conductor barrier cell as indicated above, but can be any other type of cell that is capable of generating a small current when any radioactive radiation such as alpha, beta, gamma or neutron rays impinge upon it. Thus a phototransistor can be used for this purpose. Such a phototransistor can for example be a body of germanium or silicon with a p-N junction exposed to radiation and electrically biased in the current-blocking direction. The impingement of radiation lowers the blocking effect of the barrier junction and permits an appreciable amount of current to pass. The low-frequency-radiation-energized transducer of Figs. 1 or 2 can be used to effect the biasing as well as any amplification that is desired. Also with a phototransistor considerable change of current accompanies minor changes of radiation, hence the radiation transducer and amplifier are combined into one element. For best results, the phototransistor should be made insensitive to other radiation that could mask the subatomic radiation. By way of example, the exposed junction can be covered with a light-impermeable material through which gamma rays or the like will readily pass. A thin sheet of metal or a paint layer will be satisfactory. Low atomic weight materials, such as aluminum, are particularly desirable since they will offer the least resistance to radioactive radiation while still preventing any light transmission.

As many apparently widely different embodiments of this invention may be made without departing from the spirit and scope hereof, it is to be understood that the invention is not limited to the specific embodiments hereof except as defined in the appended claims.

What is claimed is:

1. A batteryless atomic radiation indicator having a semiconductor barrier layer cell that spontaneously generates a minute electrical current when it receives atomic radiation, a transistor connected to said cell to amplify the generated current, a power-supplying transducer energized by low-frequency radiation connected to power the transistor amplification and cause it to supply electric current of appreciable magnitude, and a current indicating device connected to indicate the amplified current.

2. The invention of claim 1 in which the power-supplying transducer is a photovoltaic cell.

3. The invention of claim 1 in which the power-supplying transducer is a thermocouple.

4. The invention of claim 1 in which the transistor is a junction type transistor and is connected to provide a grounded emitter amplifying circuit.

5. A batteryless atomic radiation indicator having a phototransistor exposed to any incidence of atomic radiation, a power-supplying photovoltaic cell energized by visible light connected to bias said phototransistor in the current blocking direction and a current indicating device connected to the output of said photo-transistor to indicate any variation of incident atomic radiation.

References Cited in the file of this patent

UNITED STATES PATENTS

| 2,375,130 | Perrin et al. | May 1, 1945 |
| 2,579,336 | Rack | Dec. 18, 1951 |
| 2,579,994 | Zinn | Dec. 25, 1951 |
| 2,582,850 | Rose | Jan. 15, 1952 |
| 2,588,254 | Lark-Horovitz | Mar. 4, 1952 |
| 2,622,117 | Benzer | Dec. 16, 1952 |
| 2,696,564 | Ohmart | Dec. 7, 1954 |

OTHER REFERENCES

Transistors, Theory and Practice, by Turner, published by Gernsback Pub. Inc., 1954, pages 96 and 97.